US008670070B2

(12) United States Patent
Arora et al.

(10) Patent No.: US 8,670,070 B2
(45) Date of Patent: Mar. 11, 2014

(54) METHOD AND SYSTEM FOR ACHIEVING BETTER PICTURE QUALITY IN VARIOUS ZOOM MODES

(75) Inventors: Gaurav Arora, Northborough, MA (US); Adil Jagmag, Hollis, NH (US)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/013,307

(22) Filed: Jan. 25, 2011

(65) Prior Publication Data

US 2012/0013798 A1 Jan. 19, 2012

Related U.S. Application Data

(60) Provisional application No. 61/364,628, filed on Jul. 15, 2010.

(51) Int. Cl.
*H04N 5/46* (2006.01)

(52) U.S. Cl.
USPC .......................................................... 348/445

(58) Field of Classification Search
USPC ......... 348/445, 441, 443, 446, 447, 448, 449, 348/458, 459, 913, 911
See application file for complete search history.

(56) References Cited

U.S. PATENT DOCUMENTS

| | | | |
|---|---|---|---|
| 6,674,799 B2* | 1/2004 | Rhee ........................ | 375/240.21 |
| 7,379,105 B1* | 5/2008 | Frank et al. ................... | 348/242 |
| 7,383,509 B2* | 6/2008 | Foote et al. ................... | 715/731 |
| 7,408,139 B2* | 8/2008 | Sekimoto et al. .......... | 250/208.1 |
| 7,616,868 B2* | 11/2009 | Hosoda et al. ................ | 386/241 |
| 8,228,979 B2* | 7/2012 | Washino .................. | 375/240.01 |
| 8,249,164 B2* | 8/2012 | Sadowski ................ | 375/240.25 |
| 2005/0232606 A1* | 10/2005 | Hosoda et al. ................ | 386/111 |
| 2009/0190846 A1* | 7/2009 | Mevissen ...................... | 382/236 |
| 2010/0002069 A1* | 1/2010 | Eleftheriadis et al. ..... | 348/14.08 |
| 2011/0164115 A1* | 7/2011 | Bennett et al. .................. | 348/46 |
| 2011/0221864 A1* | 9/2011 | Filippini et al. ................ | 348/43 |
| 2012/0033039 A1* | 2/2012 | Sasaki et al. .................... | 348/43 |
| 2012/0106921 A1* | 5/2012 | Sasaki et al. .................. | 386/230 |
| 2012/0121204 A1* | 5/2012 | Ding et al. .................... | 382/260 |

* cited by examiner

*Primary Examiner* — Paulos M Natnael
(74) *Attorney, Agent, or Firm* — Thomas | Horstemeyer, LLP

(57) ABSTRACT

A method and system are provided in which a video image may be scaled from a first to a second video format. The scaling may be a non-uniform scaling such as an anamorphic scaling. When panning associated with the scaled video image is detected, one or more end portions of a current frame of the scaled video image may be adjusted, the adjustment being based on one or more frames of the scaled video image that are previous to the current frame. The adjustment may result from combining information from the corresponding end portion of previous frames with the information of the current frame. One or more end portions that are opposite to the ones adjusted may also be adjusted based on one or more frames of the scaled video image that are subsequent to the current frame. The panning detected may be horizontal, vertical, or a combination thereof.

16 Claims, 14 Drawing Sheets

METHOD AND SYSTEM FOR ACHIEVING BETTER PICTURE QUALITY IN VARIOUS ZOOM MODES

CROSS-REFERENCE TO RELATED APPLICATIONS/INCORPORATION BY REFERENCE

This application claims priority to and makes reference to U.S. Provisional Patent Application Ser. No. 61/364,628 filed on Jul. 15, 2010.

The above stated application is hereby incorporated herein by reference in its entirety.

FIELD OF THE INVENTION

Certain embodiments of the invention relate to processing of video signals. More specifically, certain embodiments of the invention relate to a method and system for achieving better picture quality in various zoom modes.

BACKGROUND OF THE INVENTION

Televisions typically support a range of view modes, including letterboxing and/or pillarboxing, zooms that employ clipping of a source, and zooms that employ scaling of the image provided by the video source without preserving the original aspect ratio. In some instances, a television can support a combination of the above-described modes. Such view modes can have an effect on image quality, particularly on the smoothness and/or sharpness of the scaled or zoomed video image.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for achieving better picture quality in various zoom modes, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
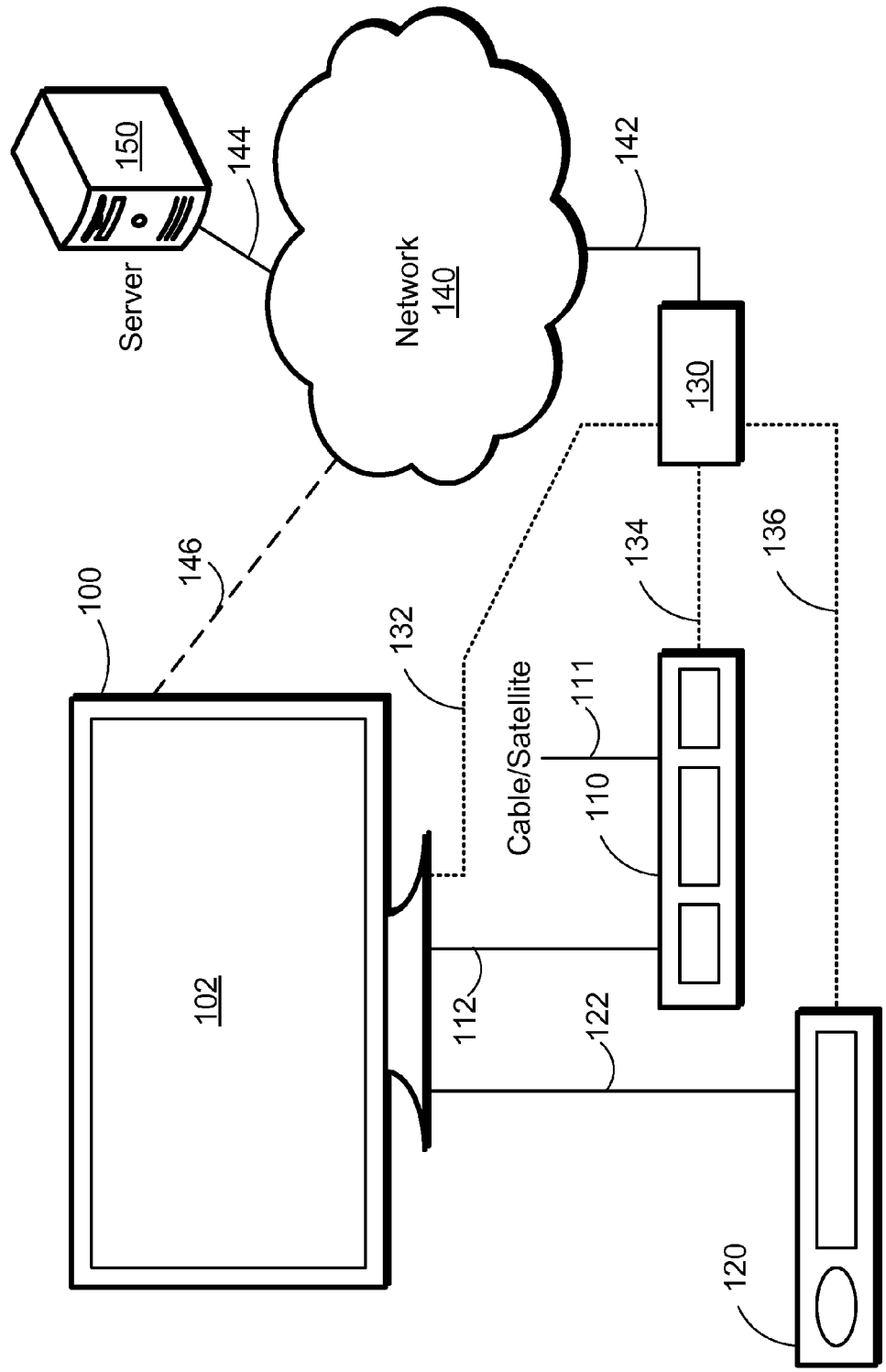
FIG. 1 is a block diagram of an exemplary system for delivering multiple video signals to a display unit, in accordance with an embodiment of the invention.

Certain embodiments of the invention can be found in a method and system for achieving better picture quality in various zoom modes. Various embodiments of the invention provide for a video processor that may scale a video image from a first video format to a second video format, detecting panning associated with the scaled video image, and adjusting, when the panning is detected, one or more end portions of a current frame of the scaled video image. The first video format may be a 4:3 aspect ratio video format and the second video format may be a 16:9 aspect ratio video format, for example. Other video formats, however, may also be utilized. The scaling of the video image may comprise non-uniform scaling, such as an anamorphic scaling, for example. The scaling need not be limited to full screen scaling, for example, but may also be utilized in instances where the scaling involves less than a full screen. Moreover, the video processor may be operable to detect panning that is horizontal, vertical, or a combination thereof. In this regard, the video processor may adjust one or more end portions of the current frame according to the panning direction detected.

The adjustment of the end portion of the current frame of the scaled video image may be based on one or more frames of the scaled video image that are previous to the current frame. The adjustment of the end portion of the current frame may comprise combining information of the end portion of the current frame with information of a corresponding end portion of the one or more frames that are previous to the current frame. The opposite end portion of the current frame may be adjusted based on one or more frames of the scaled video image that are subsequent to the current frame. The adjustment of the opposite end portion of the current frame may comprise combining information of the opposite end portion of the current frame with information of a corresponding opposite end portion of the one or more frames that are subsequent to the current frame.

The panning that is to be detected may be a substantially horizontal panning. In such instances, the end portion of the current frame may be associated with a vertical end of the current frame, and the opposite end portion of the current frame may be associated with the other vertical end of the current frame. The panning that is to be detected may also be substantially vertical panning. In such instances, the end portion of the current frame may be associated with a horizontal end of the current frame, and the opposite end portion of the current frame may be associated with the opposite horizontal end of the current frame. The panning that is to be detected may also be a combination of a horizontal panning and a vertical panning. For example, the panning may be in a right-down direction, a right-up direction, a left-down direction, or a left-up direction, wherein the angle associated with the panning direction may be vary from frame to frame.

In another embodiment of the invention, a method and/or a system may be provided in which a video image may be digitally zoomed. The digital zooming of the video image may comprise anamorphic scaling, for example. For a current frame of the digitally zoomed video image, one or more frames that correspond to the current frame may be selected, wherein each of the one or more frames is associated with an angle of view that is different from the angle of view of the current frame. Information for each selected frame may be combined with information for the current frame to generate an augmented current frame of the digitally zoomed video image. The combining of information may comprise interpolating the information of the current frame, interpolating the information of each selected frame, and blending the interpolated information of the current frame and the interpolated information of each selected frame.

The above-described operations may be utilized to improve or enhance the image quality, particularly the smoothness and/or sharpness of scaled or zoomed video images. For example, anamorphic scaling may be typically used in some zoom modes to provide non-uniform scaling, such scaling generally being, but not limited to, horizontal or substantially horizontal scaling. In some instances, however, the scaling, whether uniform or non-uniform, may comprise vertical scaling, or a combination of vertical and horizontal scaling. In anamorphic scaling, the video content in the center of the screen may be minimally stretched while the video content at the edges of the screen may be stretched somewhat more to compensate. This approach may result in a jarring effect that may be noticeable during panning of the video image on the screen. To reduce or eliminate this jarring effect, a panning motion may be detected and one or more frames may be utilized to augment the current frame. This detection and augmentation may be utilized to reduce the jarring effect on one of the edges. For example, the left edge of the video image on the screen may be improved if the panning motion is from left to right or the right edge of the video image may be improved if the panning motion is from right to left. The other edge may also be augmented by using buffered frames from future or subsequent frames to the current frame. More complicated panning, such as when multiple pannings occur in the same video image, for example when tickers are being displayed, may be handled in a similar manner by detecting the panning regions and augmenting the matching regions within the current frame.

In another embodiment of the invention, zoomed images can be improved for certain sources, such as a Blu-ray Disc (BD) players, for example, by utilizing additional angles of the same video content that may have been captured during filming, encoded, and stored. Such an enhancement mode may be performed by the television or other like display device, and/or by the video player. For example, the video processing engine carrying out the zooming operation may have access to various angles of a particular frame of a video image and may utilize the additional information comprised in those other frames to augment or modify the current frame to achieve better quality.

FIG. 1 is a block diagram of an exemplary system for delivering multiple video signals to a display unit, in accordance with an embodiment of the invention. Referring to FIG. 1, there is shown a display unit 100, a set-top-box 110, a DVR 120, and a network interface device 130. Also shown in FIG. 1 are a network 140 and a server 150.

The display unit 100 may comprise suitable logic, circuitry, code, and/or interfaces that may be operable to receive video signals from one or more sources and to process the received video signals. In this regard, the display unit 100 may be operable to process the video image data and/or the audio data video comprised within such video signals. When the video image data and the audio data are combined in some manner within the video signal, the display unit 100 may be operable to receive the video signal and separate the video image data from the audio data. Once separated, the display unit 100 may process the video image data and may display the video images associated with the processed video image data. Moreover, the display unit 100 may process the audio data and may reproduce the audio or sound associated with the processed audio data.

When the video image data and the audio data are separate within the video signal, such as when carried by separate signals within the video signal, for example, the display unit 100 need not separate the video image data from the audio data. For example, the video signal may include one or more image signals that comprise the video image data. In such an instance, the display unit 100 may be operable to process the video image data in the image signals to display the video images associated with the processed video image data. The video signal may also include one or more audio signals that comprise the audio data. In such an instance, the display unit 100 may be operable to process the audio data in the audio signals to reproduce the audio or sound associated with the processed audio data.

The display unit 100 may comprise a visual display or screen 102 that may be operable to display the video images associated with the video image data processed by the display unit 100. The screen 102 may be based on a display technology such as cathode ray tubes (CRTs), liquid crystal displays (LCDs), plasma display panels (PDPs), thin film transistor LCDs (TFT-LCDs), plasma, light emitting diode (LED), Organic LED (OLED), or other flatscreen display technology, for example. The screen 102 may support one or more aspect ratios when displaying video images such, but not limited to, a 4:3 standard aspect ratio and a 16:9 widescreen aspect ratio, for example. For the standard aspect ratio, the screen 102 may support a width of 1024 pixels and a height of 768 pixels, or a proportionally equivalent pixel count. For the widescreen aspect ratio, the screen 102 may support a width of 1024 pixels and a height of 576 pixels, or a proportionally equivalent pixel count. The display unit 100 may comprise one or more speakers (not shown) and/or may be communicatively coupled to one or more speakers (not shown), wherein the speakers may be utilized to reproduce the audio or sound associated with the audio data processed by the display unit 100.

The display unit 100 may be operable to support digital zooming or scaling of the video images. For example, when the received video images are suitable for a 4:3 standard aspect ratio but the display unit 100 supports a 16:9 widescreen aspect ratio, the video image may be scaled to match the aspect ratio supported by the display unit 100. Similarly, when the received video images are suitable for a 16:9 widescreen aspect ratio but the display unit 100 supports a 4:3 standard aspect ratio, the video image may be scaled to match the aspect ratio supported by the display unit 100.

The display unit 100 may be operable to receive content, such as video content comprising video images, that may be me formatted in one of multiple different types of aspect ratios. For example, the display unit 100 may receive video content in 4:3 standard aspect ratio, video content in a 16:9 widescreen aspect ratio, movie content in an 1.85:1 or 2.39:1 aspect ratio, and/or camera content in 1.5:1 aspect ratio. The display unit 100 may be operable to display the received content in one or more aspect ratios, which may comprise a 4:3 standard aspect ratio, a 16:9 widescreen aspect ratio, and a 21:9 aspect ratio, for example. Because the content may be received in any one of several aspect ratios and the display unit 100 may support any one of several aspect ratios for displaying the content received, conversions between aspect ratios through scaling and/or digital zooming may be necessary. In this regard, the conversions need not be limited to scaling or zooming to full screen, such conversions may also involve scaling or zooming to different proportions of the screen based on the user and/or the application.

The display unit 100 may be operable to provide digital zooming and scaling enhancement operations. For example, the display unit 100 may be operable to detect panning in a current frame of a scaled video image and to augment or enhance the current frame based on one or more previous frames and/or one or more future or subsequent frames that correspond to the current frame. Moreover, the display unit 100 may be operable to augment or enhance a current frame of a digitally zoomed video image based on other frames that correspond to the current frame but were taken, during filming, at different angles from an angle of the current frame. The frames comprising content associated with different angles from the angle of the current frame may be received by the display unit 100 from the set-top-box 110, the DVR 120, the network interface device 130, and/or the server 150 through the network 140, for example.

While the display unit 100 may typically be a television, the invention need not be so limited. For example, the display unit 100 may be a monitor, a handheld device, a portable device, a stationary device, or other like device that is capable of receiving video signals from one or more sources, and processing and/or handling the video content associated with the received video signals. When the display unit 100 is a television, the display unit 100 may support multiple technical standards such as digital television (DTV) and high-definition television (HDTV), for example.

The display unit 100 may receive video signals comprising video image data and/or audio data from one or more sources. For example, the display unit 100 may receive video signals from traditional radio frequency broadcasts and/or may generate video signals from signals received through traditional radio frequency broadcasts. In another example, the display unit 100 may receive video signals from other sources such as the set-top-box 110, the DVR 120, and/or the network interface device 130. Each of the set-top-box 110, the DVR 120, and/or the network interface device 130 may provide one or more video signals to the display unit 100. When a single device provides multiple video signals to the display unit 100, the various video signals provided may be based on different formats, standards, and/or protocols, for example. In this regard, the video signals received by the display unit 100 may be associated with different sources when provided by different devices and/or services, and/or when based on different formats, standards, and/or protocols.

As described above, the display unit 100 may receive video signals comprising video content such as video image data and/or audio data. In this regard, the display unit 100 may comprise one or more processing devices (not shown) that may be operable to process the video image data and/or the audio data received by the display unit 100. For example, a processing device in the display unit 100 may process the video image data comprised within a video signal such that the video images associated with the video image data may be displayed. Similarly, the same processing device, or another processing device in the display unit 100, may process the audio data comprised within the video signal such that the audio or sound associated with the audio data may be reproduced. The processing device in the display unit 100 may be operable to improve or enhance the image quality of scaled or digitally zoomed video images. Exemplary embodiments of such processing devices are described below with respect to FIG. 2.

The set-top-box 110 may comprise suitable logic, circuitry, code, and/or interfaces that may be operable to receive signals from a cable or satellite operator that provides television services and/or other type of programming services. The set-top-box 110 may be operable to process the signals received from the operator to generate one or more video signals that may be communicated to the display unit 100. In this regard, the set-top-box 110 may receive signals from the cable operator or from a satellite antenna (not shown) via a link 111 and may communicate the video signals to the display unit 100 via a link 112. The links 111 and 112 may comprise, for example, suitable connectors, coaxial cables, wires, and/or optical fibers that enable wired communication to and/or from the set-top-box 110. In an embodiment of the invention, at least a portion of the link 111 and/or at least a portion of the link 112 may comprise a wireless communication link.

The DVR 120 may comprise suitable logic, circuitry, code, and/or interfaces that may be operable to digitally record and/or play back video content. For example, the DVR 120 may digitally record and/or play back video image data and/or audio data. The DVR 120 may support recording and/or play back operations in one or more formats that may include, but need not be limited to, a compact disc (CD) format, a digital video disc (DVD) format, and a Blu-ray Disc (BD) format, for example. The DVR 120 may utilize a memory medium, such as a disk drive, a universal serial bus (USB) flash drive, a non-volatile memory card (e.g., secure digital (SD) memory card), and/or other type of digital storage medium in which to digitally record and/or from which to play back video image data and/or audio data. The DVR 120 may also be operable to augment or enhance a current frame of a digitally zoomed video image based on other frames that correspond to the current frame but were taken, during filming, at different angles from an angle of the current frame. The frames comprising content associated with different angles from the angle of the current frame may be received by the DVR 120 from those frames stored in a memory medium utilized in connection with the DVR 120, and/or from the server 150 through the network 140.

In some embodiments of the invention, the DVR 120 may be a portable device or an application for a personal computer that enables capturing, storing, and/or playing back video image data and/or audio data. When in a play back mode of operation, the DVR 120 may generate one or more video signals that may be communicated to the display unit 100 via a link 122. The link 112 may comprise, for example, suitable connectors, coaxial cables, wires, and/or optical fibers that enable wired communication between the DVR 120 and the display unit 100. In an embodiment of the invention, at least a portion of the link 122 may comprise a wireless communication link.

In an embodiment of the invention, some or all of the functions or operations supported by the DVR 120 may be implemented in the set-top-box 110. For example, the set-top-box 110 may receive one or more signals from the cable or satellite operator and may digitally record video content associated with the received signals. The set-top-box 110 may also play back the digitally recorded video content to generate video signals that are communicated to the display unit 100.

In another embodiment of the invention, some or all of the functions or operations supported by the DVR 120 and some or all of the functions or operations supported by the set-top-box 110 may be implemented in the display unit 100. That is, the display unit 100 may receive video signals from the cable or satellite operator, or may generate video signals from signals received from the cable or satellite operator. Moreover, the display unit 100 may digitally record video content associated with the received signals. In this regard, the display unit 100 may play back the digitally recorded video content, display the video images associated with the video content, and/or reproduce the audio or sound associated with the video content.

The network interface device 130 may comprise suitable logic, circuitry, code, and/or interfaces that may be operable to communicatively couple one or more devices to the network 140. The network 140 may be the Internet or other wide area network (WAN), for example. The network interface device 130 may be communicatively coupled to one or more of the display unit 100, the set-top-box 110, and the DVR 120 via links 132, 134, and 136, respectively. Each of the links 132, 134, and 136 may support wired and/or wireless communication between the network interface device 130 and the display unit 100, the set-top-box 110, and the DVR 120.

In an embodiment of the invention, the network interface device 130 may be a residential gateway that may comprise suitable hardware and/or software to provide some or all of the functions and/or operations of one or more of a modem (e.g., digital subscribed line (DSL) modem, cable modem, wireless cable modem), a router (e.g., wireless router), and a switch (e.g., network switch, local area network (LAN) switch).

The network interface device 130 may be utilized to provide IPTV services and/or other network-based video content delivery services to one or more of the display unit 100, the set-top-box 110, and the DVR 120 via the links 132, 134, and 136, respectively. The network interface device 130 may provide video signals to the display unit 100 in connection with the IPTV services and/or the network-based video content delivery services. Moreover, the network interface device 130 may provide signals to the set-top-box 110 and/or to the DVR 120 that may be utilized by those devices to generate video signals that may be communicated to the display unit 100 for processing. The network interface device 130 may be communicatively coupled to the network 140 via a link 142, which may support wired and/or wireless communication between the network interface device 130 and the network 140.

The server 150 may comprise suitable logic, circuitry, code, and/or interfaces that may be operable to provide video content through IPTV services and/or other network-based video delivery services. The server 150 may also provide, via the network interface device 130, data or information, other than video content, to the display unit 100, the set-top-box 110, and/or the DVR 120. For example, the server 150 may provide profile information, such as operating parameters, that may be utilized to configure one or more processing devices in the display unit 100. The server 150 may be communicatively coupled to the network 140 via a link 144, which may support wired and/or wireless communication between the server 150 and the network 140. The server 150 may comprise video content having multiple related concurrent frames, wherein each of those related concurrent frames has information associated with a different angle of view. The related concurrent frames may result from, for example, filming or recording video content associated with a same scene from different angles of view. The server 150 may be utilized to provide or send the related concurrent frames to the digital display 110 and/or the DVR 120 to process the related concurrent frames in connection with augmenting or enhancing the image quality in a digitally zoomed video image.

While a single server 150 is shown in FIG. 1, the invention need not be so limited. For example, multiple servers may be utilized for the delivery of video content to the display unit 100, the set-top-box 110, and/or the DVR 120 via the network interface device 130. In another example, one or more servers may be utilized for the delivery of data or information other than video content to the display unit 100, the set-top-box 110, and/or the DVR 120 via the network interface device 130.

Although not shown in FIG. 1, the display unit 100 may wirelessly communicate with the network 140 by utilizing a wireless protocol such as the worldwide interoperability for microwave access (WiMAX) communication protocol, for example. In this manner, IPTV services, other network-based video content delivery services, and/or data or information other than video content may be provided to the display unit 100 via a wireless link 146.

Figure 2:
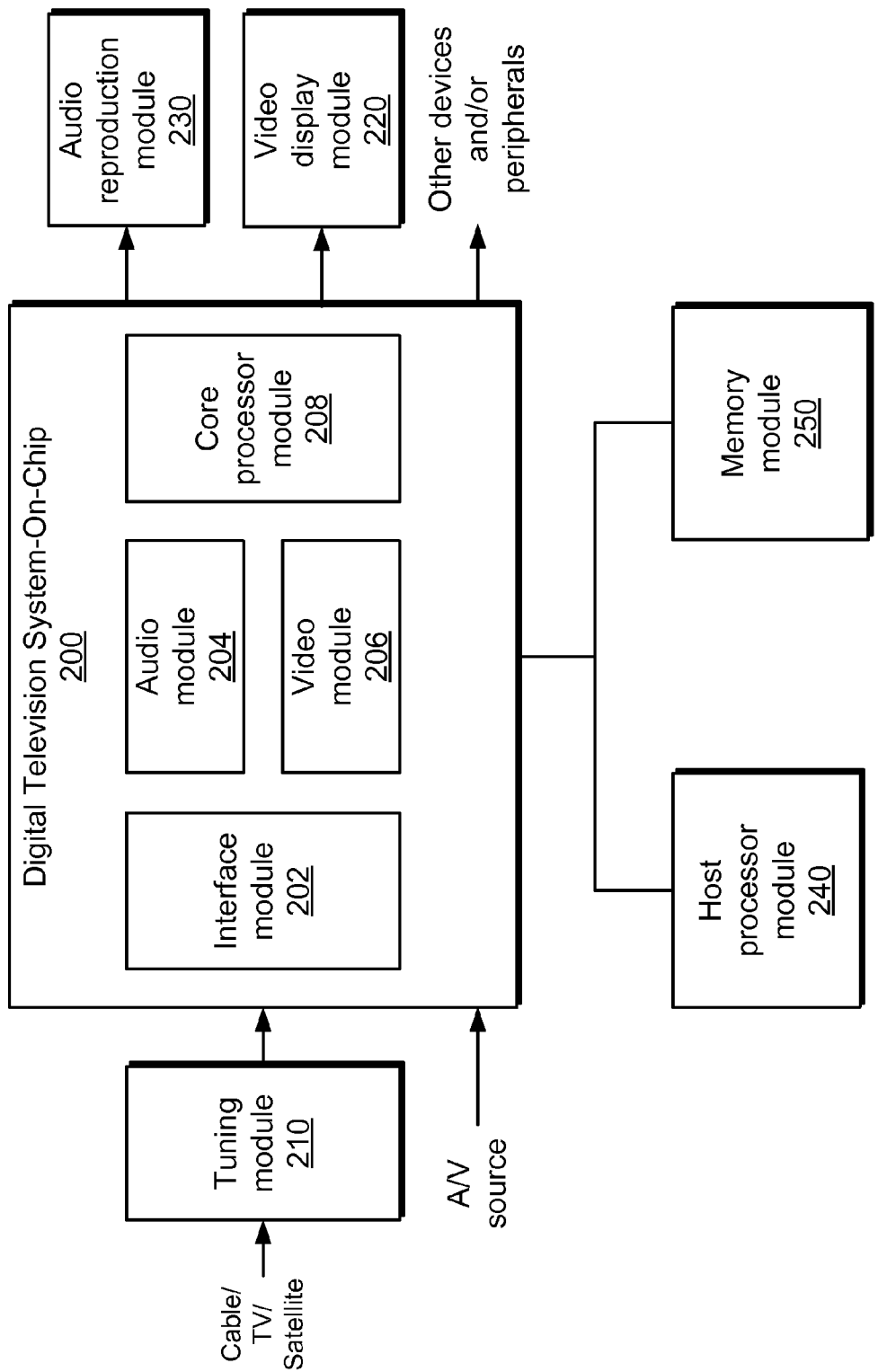
FIG. 2 is a block diagram illustrating an exemplary system for processing video image data and audio data in a display unit, in accordance with an embodiment of the invention.

FIG. 2 is a block diagram illustrating an exemplary system for processing video image data and audio data in a display unit, in accordance with an embodiment of the invention. Referring to FIG. 2, there is shown a digital television system-on-chip (DTV SoC) 200, a video display module 220, an audio reproduction module 230, a host processor module 240, and a memory module 250.

The DTV SoC 200 may comprise suitable logic, circuitry, code, and/or interfaces that may be operable to receive and process one or more video signals that comprise video content. Examples of video signals that may be received and processed by the DTV SoC 200 include, but need not be limited to, a CVBS signal, an S-video signal, an HDMI signal, a component signal, a PC signal, an SIF signal, and an RGB signal. The video source signals may be received from a tuning module 210 and/or from one or more audio/visual (A/V) sources. The video signals received by the DTV SoC 200 may include image signals that comprise video image data and/or audio signals that comprise audio data.

The processing of a video signal by the DTV SoC 200 may comprise various operations such as display control operations, scaling operations, picture enhancement operations, digital noise reduction operations, analog noise reduction operations, letterbox detection operations, video capture and feeding operations, and/or video bypass and routing operations. The DTV SoC 200 need not be so limited and other operations associated processing a video signal may also be performed.

The display control operations supported by the DTV SoC 200 may comprise configuring DTV SoC 200 to support multiple display output formats. In this regard, the data transfer in the DTV SoC 200 may be controlled utilizing a self-regulating data flow control mechanism.

The scaling operations supported by the DTV SoC 200 may comprise two-dimensional scaling, including standard definition (SD) scaling, high-definition (HD) scaling, and/or non-linear horizontal scaling with multiple scaling regions in which the side regions may utilize a higher-order difference equation for the scale factor. The DTV SoC 200 may also support video image cropping. The scaling operations may utilize separate luma and chroma coefficients, for example.

The picture enhancement operations supported by DTV SoC 200 may comprise adjustments to the color space, sharpness, and brightness of the video images to improve image quality. Such improvements in image quality may be utilized in connection with various functions that may include, but need not be limited to, auto-flesh, green boost, soft saturate luma, black stretch adjustment, histogram equalization, blue shift, and sharpness improvement. The picture enhancement operations may also enable 3D color management adjustments over various regions of a video image based on luma-chroma or hue-saturation coordinates, for example. Within each of these regions, both luma and chroma adjustments may be possible.

The digital noise reduction (DNR) operations supported by the DTV SoC 200 may comprise adaptive block noise reduction and adaptive mosquito noise reduction. In some embodiments of the invention, the digital noise reduction operations may be applied before scaling or de-interlacing operations. The digital noise reduction operations may be applied to video image data in various formats, such as MPEG or Advanced Video Coding (AVC) formats, for example, and in various resolutions, including SD and HD, for example.

The analog noise reduction (ANR) operations supported by DTV SoC 200 may comprise reduction of random noise that may be result from the external video source. For example, the analog noise reduction operations may include, but need not be limited to, motion detection, edge detection, and adaptive temporal filter that are utilized to reduce random noise.

The letterbox detection operation supported by the DTV SoC 200 may comprise aspect ratio detection, black line detection, black column detection. In this regard, the letterbox detection operation may support letterbox format detection, pillarbox format detection, and postage-stamp format detection. When a video image has an ambiguous format, whether because the video image is mostly black or has excessive noise, the letterbox detection operation may consider or treat such a video image as being letterbox formatted. The letterbox detection operation need not change the formatting of the video images automatically, but may do so based on different usage models and/or user input.

The video capture operations supported by the DTV SoC 200 may comprise receiving video image data from one or more modules within the DTV SoC 200, formatting the video image data and sending the video image data to memory, such as a Dynamic Random Access Memory (DRAM) external to the DTV SoC 200. Exemplary formatting of the video image data may comprise down-sampling rounding and/or truncation. The video feeding operations supported by the DTV SoC 200 may comprise receiving video image data from memory external to the DTV SoC 200, formatting the video image data (e.g., up-sampling), and sending the video image data to one or more modules within the DTV SoC 200 for processing.

The video display module 220 may comprise suitable logic, circuitry, code, and/or interfaces that may be operable to receive one or more signals comprising processed video image data from the DTV SoC 200 and to display the video images associated with the processed video image data received. In this regard, the video display module 220 may correspond to a screen such as the screen 102 of the display unit 100 described above with respect to FIG. 1. The audio reproduction module 230 may comprise suitable logic, circuitry, code, and/or interfaces that may be operable to receive one or more signals from the DTV SoC 200 comprising processed audio data and to reproduce the audio or sound associated with the processed audio data received. In this regard, the audio reproduction module 230 may correspond to one or more speakers of the display unit 100 and/or to one or more speakers communicatively coupled to the display unit 100.

The host processor module 240 may comprise suitable logic, circuitry, code, and/or interfaces that may be operable to control and/or configure the operation of the DTV SoC 200. For example, the host processor module 240 may be utilized to provide user-based instructions and/or other instructions to the DTV SoC 200. The instructions may include mode selections that enable the DTV SoC 200 to improve and/or enhance image quality of scaled or digitally zoomed video images. The memory module 250 may comprise may comprise suitable logic, circuitry, code, and/or interfaces that may be operable to store information associated with the operation of the DTV SoC 200. For example, the memory module 250 may store intermediate values associated with the processing of video image data and/or audio data by the DTV SoC 200. Moreover, the memory module 250 may be utilized to stored information associated with which of the video signals received by the DTV SoC 200 is active and/or is locked-in within the DTV SoC 200. As described above, the memory module 250 may be utilized to store or buffer previous frames, current frames, future or subsequent frames, and/or concurrent frames having different angles of view, which may be utilized by the DTV SoC 200 for video signal processing.

The tuning module 210 may comprise suitable logic, circuitry, code, and/or interfaces that may be operable to tune in to a video signal and/or other signal received from one or more sources. For example, the tuning module 210 may be utilized to tune to a video signal and/or other signal received from a radio frequency broadcast and/or from a set-top-box. The tuning module 210 may be utilized to tune in to more than one signal. In some embodiments of the invention, the tuning module 210 may be integrated within the DTV SoC 200. In this regard, the DTV SoC 200 may receive video signals from various audio/video (A/V) sources from such sources without the need for an external tuner.

The DTV SoC 200 may comprise an interface module 202, an audio module 204, a video module 206, and a core processor module 208. The interface module 202 may comprise suitable logic, circuitry, code, and/or interfaces that may be operable to receive, process, and/or select between multiple video signals received by the DTV SoC 200. For example, the interface module 202 may be utilized to switch between a current video signal being processed by the DTV SoC 200 and another or a next video signal being processed by the DTV SoC 200. In this regard, the interface module 202 may comprise one or more switches (not shown) and/or one or more multiplexers (not shown) to enable the interface module 202 to select one of the multiple video signals that may be received by the DTV SoC 200. The interface module 202 may be utilized to detect or determine when a video signal is active and/or to lock to a video signal.

The audio module 204 may comprise suitable logic, circuitry, code, and/or interfaces that may be operable to process audio data associated with one or more video signals. In this regard, the audio module 204 may be operable to support processing of audio data in more than one format. The video module 206 may comprise suitable logic, circuitry, code, and/or interfaces that may be operable to process video image data associated with one or more video signals. In this regard, the video module 204 may be operable to perform image quality enhancement operations on scaled or digitally zoomed video images, for example.

The core processor module 208 may comprise suitable logic, circuitry, code, and/or interfaces that may be operable to control and/or configure the operation of the DTV SoC 200. For example, the core processor module 208 may be operable to control and/or configure operations of the DTV SoC 200 that are associated with image quality enhancement operations on scaled or digitally zoomed video images.

In operation, the DTV SoC 200 may receive multiple video signals from one or more sources such as radio frequency broadcasts, cable television services, satellite television services, IPTV services, and/or DVR or PVR playback, for example. The interface module 202 and/or the core processor module 208 in the DTV SoC 200 may be utilized to select one of the video signals received by the DTV SoC 200. The video signal selected may be processed by the video module 204 and/or the audio module 206 of the DTV SoC 200. The processing of the video signal may comprise scaling a video image associated with the video signal. The scaling may be uniform or non-uniform scaling and may comprise horizontal scaling, vertical scaling, or a combination thereof. The non-uniform scaling of the video image may comprise anamorphic scaling, for example. The scaling may be from a first video format, such as a 4:3 standard aspect ratio video format, to a second video format, such as a 16:9 high-definition or widescreen aspect ratio video format. However, other video formats may also be utilized. In connection with the scaling, the DTV SoC 200 may be operable to detect one or more pannings associated with the scaled video image. For example, panning may be detected in connection with the movement or rotation of the camera from which the video image being displayed originated. Moreover, panning may be detected in connection with a ticker, such as a news ticker or crawler, for example, in which a small portion of the screen in utilized to present headlines, news, updates, scores, and/or financial information. When the panning is detected in one direction, an end portion of a current frame of the scaled video image may be adjusted. For example, a left vertical edge end portion of the video image on the screen may be improved if the panning motion is from left to right or a right vertical edge end portion of the video image may be improved if the panning motion is from right to left.

When one of the end portions of the current frame of the scaled video image is adjusted, whether it is the left vertical edge portion or the right vertical edge portion, the adjustment may be based on one or more frames of the scaled video image that are previous to the current frame. The adjustment of the end portion of the current frame may comprise combining, within the DTV SoC 200, information of the end portion of the current frame with information of a corresponding end portion of the one or more frames that are previous to the current frame. The information may be combined by, for example, an interpolation operation or other like operation.

The opposite end portion of the current frame may also be adjusted when panning is detected. In this instance, the adjustment may be based on one or more frames of the scaled video image that are subsequent or future to the current frame. The subsequent or future frames may be buffered or stored in, for example, the memory module 250, and may be available to the DTV SoC 200 in connection with other video processing operations such as noise reduction, for example. The adjustment of the opposite end portion of the current frame may comprise combining, within the DTV SoC 200, information of the opposite end portion of the current frame with information of a corresponding opposite end portion of the one or more frames that are subsequent to the current frame. As indicated above, the information may be combined by, for example, an interpolation operation or other like operation.

The panning direction need not be limited to panning from right to left or from left to right. The panning direction may also be from top-to-bottom or from bottom-to-top. Moreover, the panning direction may be right-down, right-up, left-down, or left-up. In each of these instances, the angle of the panning may vary from frame to frame. The adjustment of the current frame by the DTV SoC 200 may be based on the panning direction that is detected.

The processing of a video signal by the DTV SoC 200 may comprise digitally zooming a video image. The digital zooming may comprise anamorphic scaling, for example. For a current frame of the digitally zoomed video image, one or more frames that correspond to the current frame may be selected, wherein each of the one or more frames is associated with an angle of view that is different from the angle of view of the current frame. The various frames with different angles of view may be stored or buffered in the memory module 250, for example. Information of each selected frame may be combined within the DTV SoC 200 with information of the current frame to generate an augmented current frame of the digitally zoomed video image. The combining of information may comprise interpolating the information of the current frame, interpolating the information of each selected frame, and blending the interpolated information of the current frame and the interpolated information of each selected frame.

In some embodiments, the DTV SoC 200 may be utilized for the processing of video image data only, and not for the processing of audio data. In such instances, the various components and/or functions of the DTV SoC 200 that are utilized to process audio data need not be implemented and/or enabled within the DTV SoC 200. That is, a reduced set of modules and/or functions from those shown and/or described in connection with FIG. 2 may be utilized for the DTV SoC 200 when audio data is not to be processed.

Figure 3B:
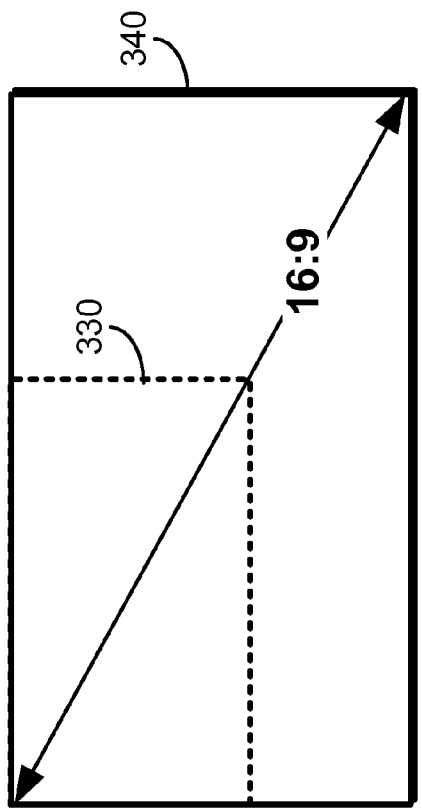
FIG. 3B is a diagram illustrating a 16:9 high-definition aspect ratio video format, in connection with an embodiment of the invention.
Figure 3A:
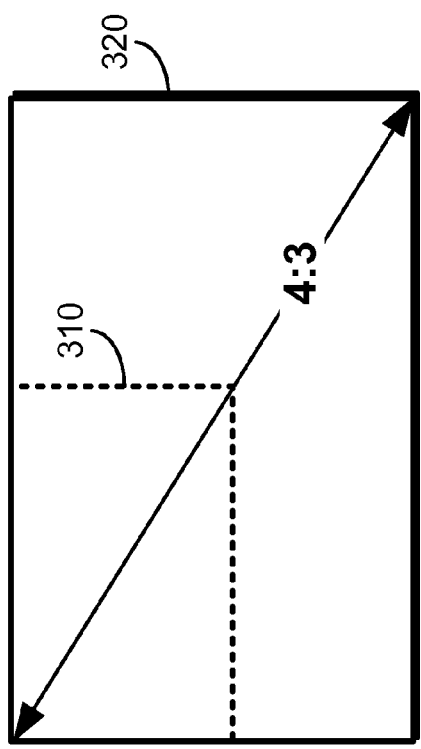
FIG. 3A is diagram illustrating a 4:3 standard aspect ratio video format, in connection with an embodiment of the invention.

FIG. 3A is diagram illustrating a 4:3 standard aspect ratio video format, in connection with an embodiment of the invention. Referring to FIG. 3A, there is shown a first video image 310 having a 4:3 standard aspect ratio video format. Also shown in FIG. 3A is a second video image 320, which has been scaled to be larger than the first video image 310 and that also has a 4:3 standard aspect ratio video format. As illustrated by FIG. 3A, it may be possible to scale or digitally zoom a video image and maintain a 4:3 standard aspect ratio video format.

FIG. 3B is a diagram illustrating a 16:9 high-definition or widescreen aspect ratio video format, in connection with an embodiment of the invention Referring to FIG. 3B, there is shown a first video image 330 having a 16:9 high-definition aspect ratio video format. Also shown in FIG. 3B is a second video image 340, which has been scaled to be larger than the first video image 330 and that also has a 16:9 high-definition aspect ratio video format. As illustrated by FIG. 3B, a video image may be scales and/or digitally zoomed so as to maintain a 16:9 high-definition aspect ratio video format.

Figure 4:
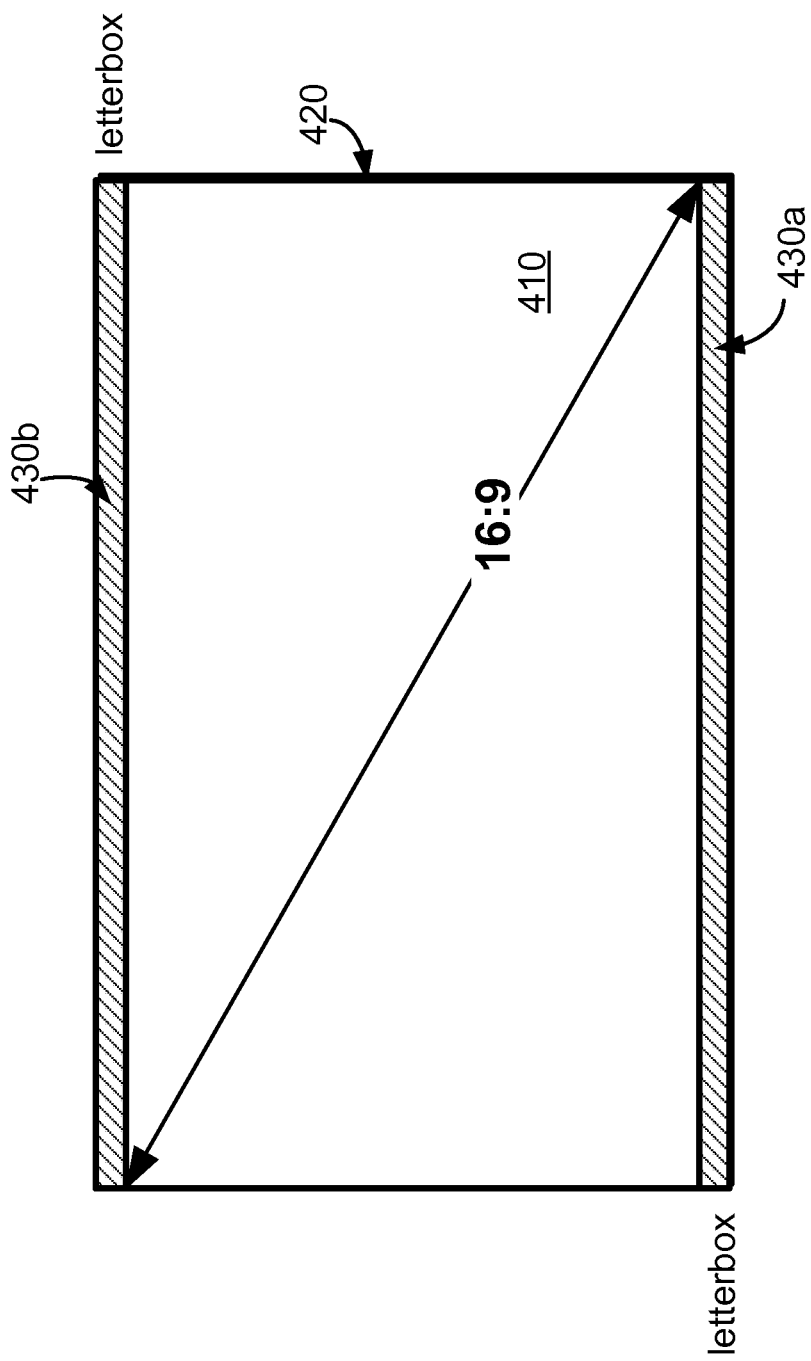
FIG. 4 is a diagram illustrating an exemplary conversion of a 16:9 aspect ratio video image to a 4:3 aspect ratio video image, in connection with an embodiment of the invention.

FIG. 4 is a diagram illustrating an exemplary conversion of a 16:9 aspect ratio video image to a 4:3 aspect ratio video image, in connection with an embodiment of the invention. Referring to FIG. 4, there is shown a first video image 410 having a 16:9 aspect ratio that may be converted by, for example, the DTV SoC 200 described above with respect to FIG. 2. The converted video image 420 may have a 4:3 aspect ratio by adding the letterbox regions 430*a* and 430*b* at the top and bottom edges of the first video image 410, respectively. Accordingly, FIG. 4 illustrates an example in which a video image may be converted from a first video format, such as a 16:9 high-definition aspect ratio video format, to a second video format, such as a 4:3 standard aspect ratio video format.

Figure 5:
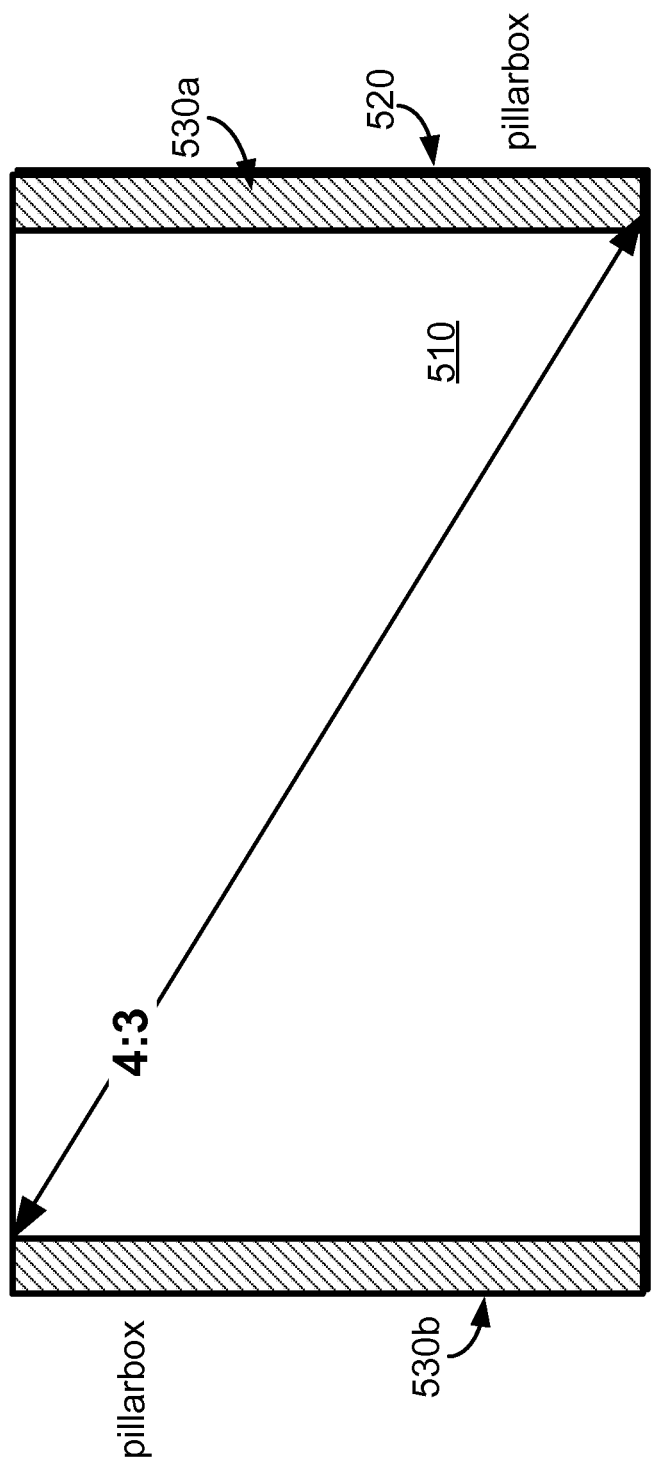
FIG. 5 is a diagram illustrating an exemplary conversion of a 4:3 aspect ratio video image to a 16:9 aspect ratio video image, in connection with an embodiment of the invention.

FIG. 5 is a diagram illustrating an exemplary conversion of a 4:3 aspect ratio video image to a 16:9 aspect ratio video image, in connection with an embodiment of the invention. Referring to FIG. 5, there is shown a first video image 510 having a 4:3 aspect ratio that may be converted by, for example, the DTV SoC 200 described above with respect to FIG. 2. The converted video image 520 may have a 16:9 aspect ratio by adding the pillarbox regions 530*a* and 530*b* at the left and right edges of the first video image 510, respectively. Accordingly, FIG. 5 illustrates an example in which a video image may be converted from a first video format, such as a 4:3 standard aspect ratio video format, to a second video format, such as a 16:9 high-definition aspect ratio video format.

The conversions described above with respect to FIGS. 4 and 5 are provided for purposes of illustration and not of limitation. Other aspect ratios may also be utilized in connection with changing the aspect ratio of a video image.

Figure 6:
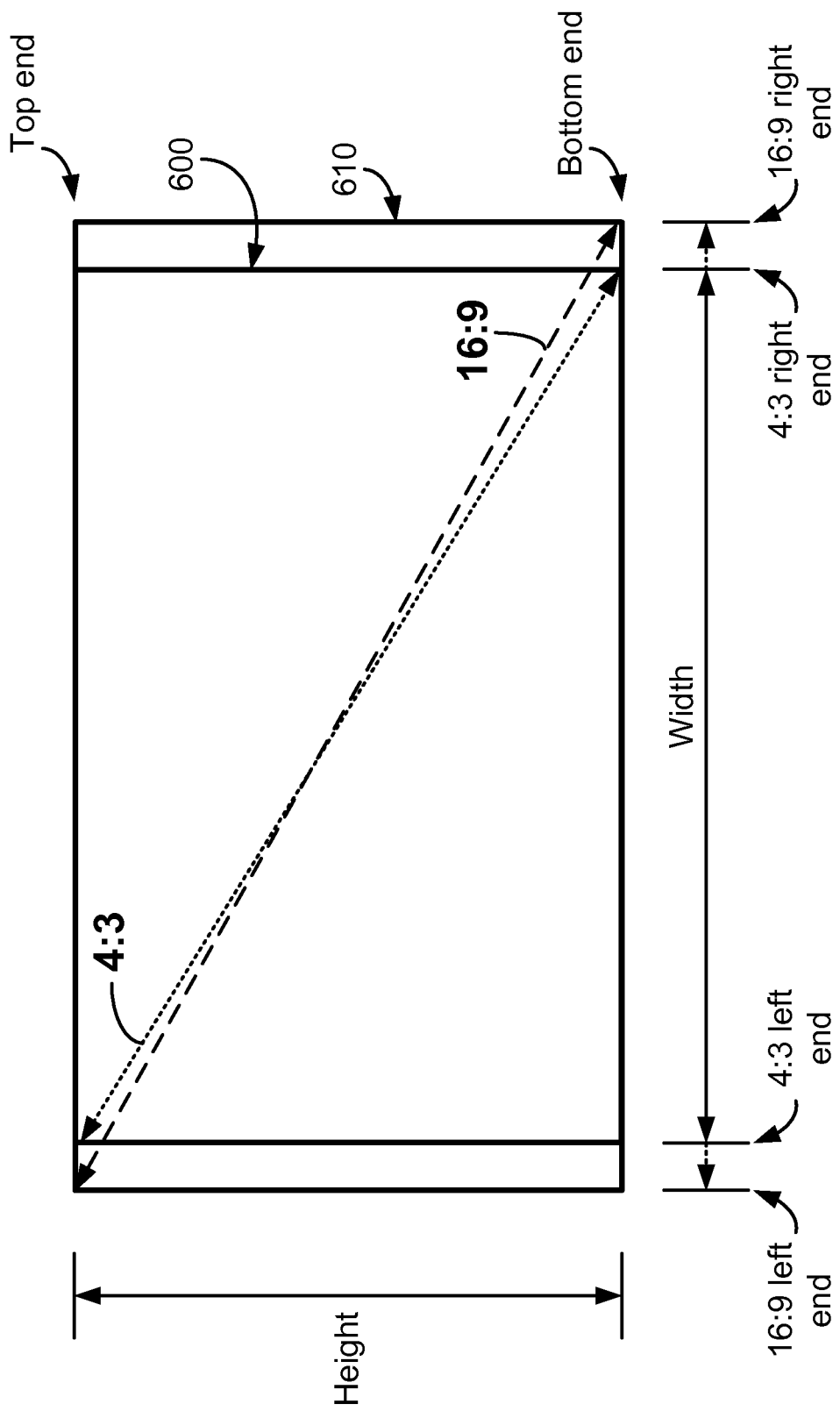
FIG. 6 is a diagram illustrating a non-uniform horizontal scaling of a 4:3 aspect ratio video image to a 16:9 aspect ratio video image, in accordance with an embodiment of the invention.

FIG. 6 is a diagram illustrating a non-uniform horizontal scaling of a 4:3 aspect ratio video image to a 16:9 aspect ratio video image, in accordance with an embodiment of the invention. Referring to FIG. 6, there is shown a first video image 600 having a 4:3 standard aspect ratio video format scaled to a second video image 610 having a 16:9 high-definition aspect ratio video format. The scaling may be performed by the DTV SoC 200, for example. In this instance, the scaling may be achieved by a non-uniform horizontal scaling of the first video image 600. The non-uniform horizontal scaling may be implemented with multiple scaling regions and the side regions may utilize a higher-order difference equation for the scale factor, for example.

When utilizing a non-uniform horizontal scaling, for example, a left vertical edge of the first video image 600 may be stretched to match a left vertical edge of the second video image 610. Similarly, a right vertical edge of the first video image 600 may be stretched to match a right vertical edge of the second video image 610. In the embodiment illustrated in FIG. 6, the top and bottom edges of both video images are shown to match and a vertical scaling need not be utilized. Accordingly, a video image may be scaled from a first video format, such as a 4:3 standard aspect ratio video format, to a second video format, such as a 16:9 high-definition aspect ratio video format, by utilizing a non-uniform horizontal scaling operation.

As described above, when a non-uniform horizontal scaling is utilized, such as an anamorphic scaling, for example, a jarring effect may occur that may be noticeable during panning of the video image on the screen. Below are described additional details regarding the reduction and/or removal of such an effect on a scaled or digitally zoomed video image.

Figure 7A:
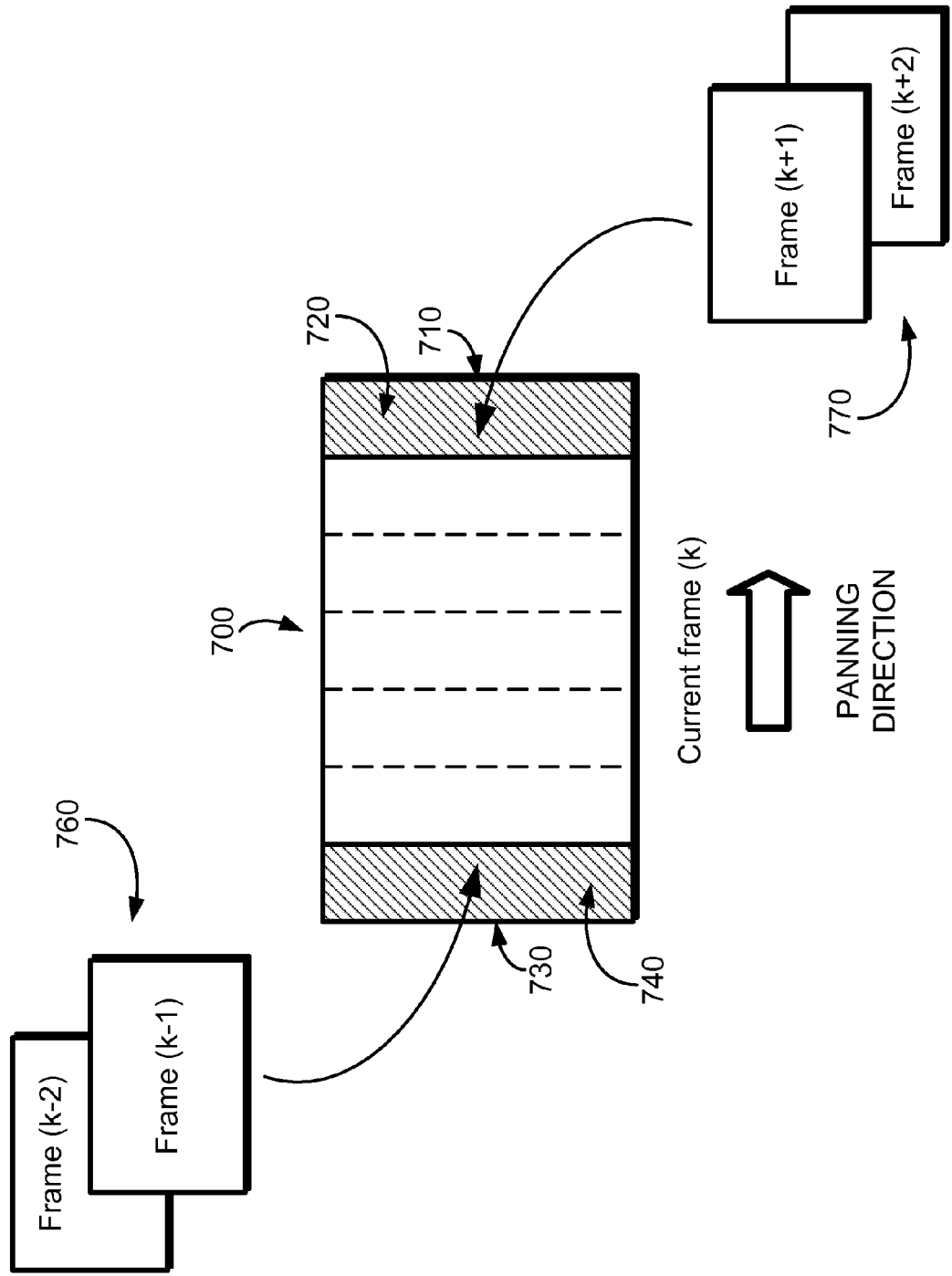
FIGS. 7A and 7B are each a diagram illustrating reduction of a jarring effect on horizontal panning content by utilizing previous and/or subsequent frames, in accordance with embodiments of the invention.
Figure 7B:
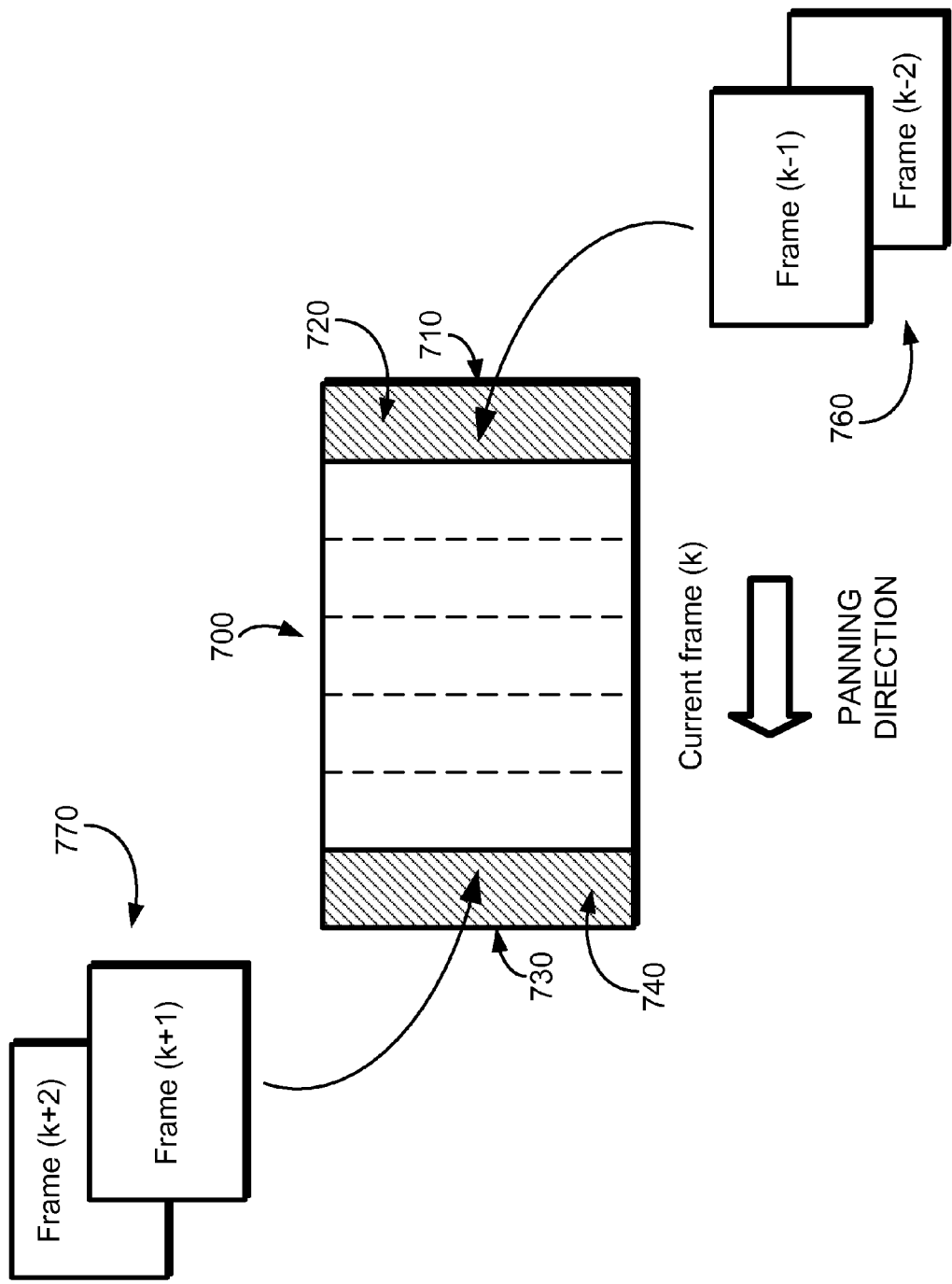

FIGS. 7A and 7B are each a diagram illustrating reduction of a jarring effect on horizontal panning content by utilizing previous and/or subsequent frames, in accordance with embodiments of the invention. Referring to FIG. 7A, there is shown a current frame 700 of a scaled video image. The scaled video image may have been scaled uniformly or non-uniformly. The current frame 700 may be referred to as current frame (k), where k is a temporal indication of the position of the frame in a sequence of frames associated with the video image. Also shown in the current frame 700 are the various scaling regions utilized when scaling the video image. Of these scaling regions, a first end region or portion 740 is shown as the left-most scaling region associated with the left vertical edge 730 of the current frame 700 of the scaled video image. Also shown is a second end region or portion 720, which is the right-most scaling region and is associated with the right vertical edge 710 of the current frame 700 of the scaled video image.

When a panning motion is detected from left to right, as shown by the arrow labeled "PANNING DIRECTION," the current frame 700 of the scaled video image may be augmented or enhanced to reduce the jarring effect that may occur as a result of the panning. For example, the first end portion 740 may be augmented or enhanced with information from frames 760 that are previous to the current frame 700 in a sequence of frames. In this instance, the first end portion 740 may be modified or adjusted utilizing information from a frame (k−1) and a frame (k−2), however, more or fewer previous frames may be utilized. The information from the previous frames may be combined with that of the current frame 700 to adjust or modify the first end portion 740. For example, interpolation operations may be utilized to combine the information of the current frame 700 and the information of the previous frames.

The second end portion 720, which is opposite to the first end portion 740, may be augmented or enhanced with information from frames 770 that are future to or subsequent to the current frame 700 in a sequence of frames. In this instance, the second end portion 720 may be modified or adjusted utilizing information from a frame (k+1) and a frame (k+2), however, more or fewer subsequent frames may be utilized. The information from the subsequent frames may be combined with that of the current frame 700 to adjust or modify the second end portion 720. For example, interpolation operations may be utilized to combine the information of the current frame 700 and the information of the subsequent frames.

With respect to FIG. 7B, when a panning motion is detected from right to left, as shown by the arrow labeled "PANNING DIRECTION," the current frame 700 of the scaled video image may be augmented or enhanced to reduce the jarring effect that may occur as a result of the panning. For example, the first end portion 740 may be augmented or enhanced with information from subsequent frames 770. In this instance, the first end portion 740 may be modified or adjusted utilizing information from a frame (k−1) and a frame (k+2), however, more or fewer subsequent frames may be utilized. The information from the subsequent frames may be combined with that of the current frame 700 to adjust or modify the first end portion 740. For example, interpolation operations may be utilized to combine the information of the current frame 700 and the information of the subsequent frames.

The second end portion 720, which is opposite to the first end portion 740, may be augmented or enhanced with information from previous frames 760. In this instance, the second end portion 720 may be modified or adjusted utilizing information from a frame (k−1) and a frame (k−2), however, more or fewer previous frames may be utilized. The information from the subsequent frames may be combined with that of the current frame 700 to adjust or modify the second end portion 720. For example, interpolation operations may be utilized to combine the information of the current frame 700 and the information of the subsequent frames.

When utilizing information from previous or subsequent frames, the information considered may be that of regions or portions of those frames that correspond to the first end portion 740 or the second end portion 720. For example, the previous and/or subsequent frames may also be divided into the same or substantially the same scaling regions or portions utilized in connection with the current frame 700.

Figure 8A:
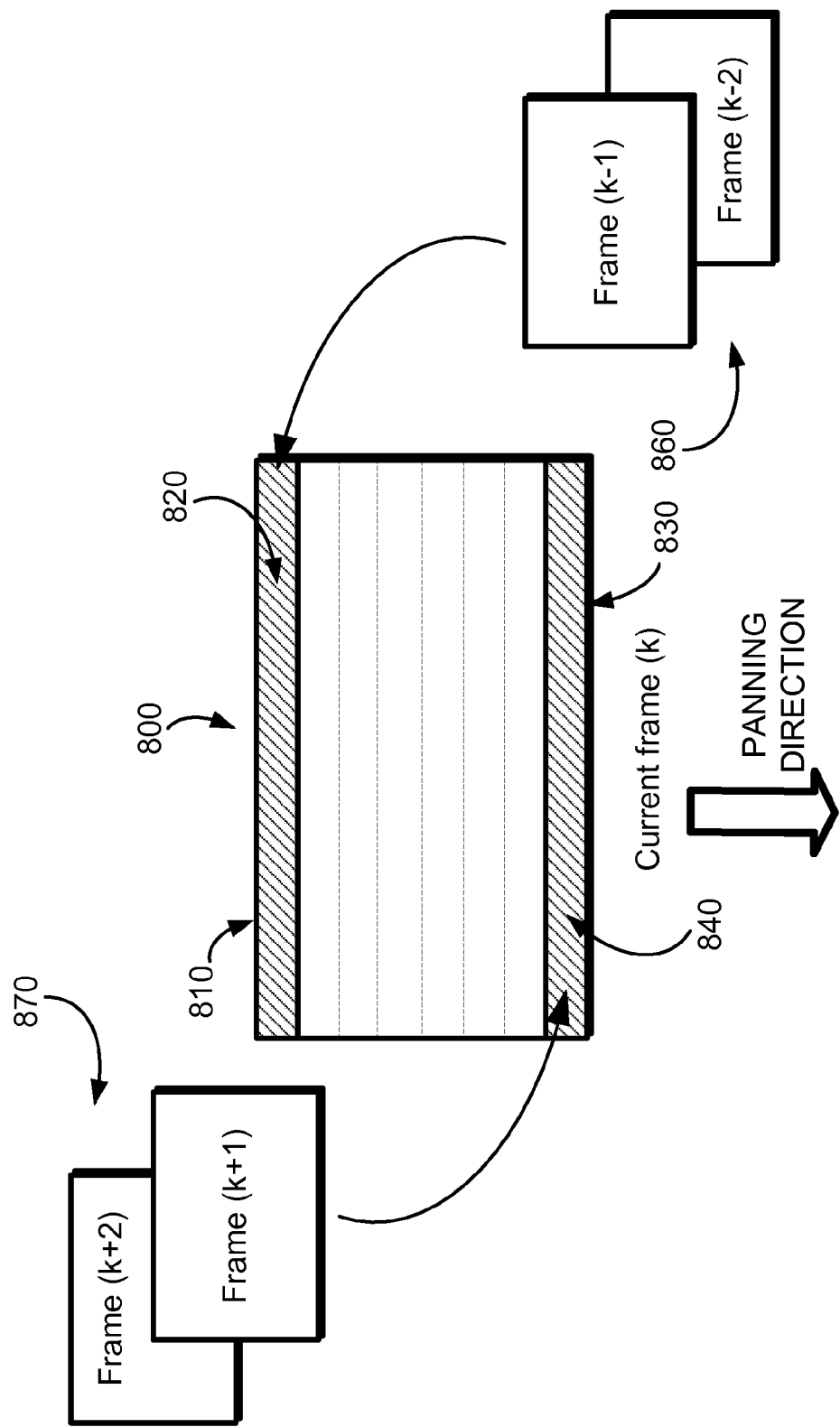
FIGS. 8A and 8B are each a diagram illustrating reduction of a jarring effect on vertical panning content by utilizing previous and/or subsequent frames, in accordance with embodiments of the invention.
Figure 8B:
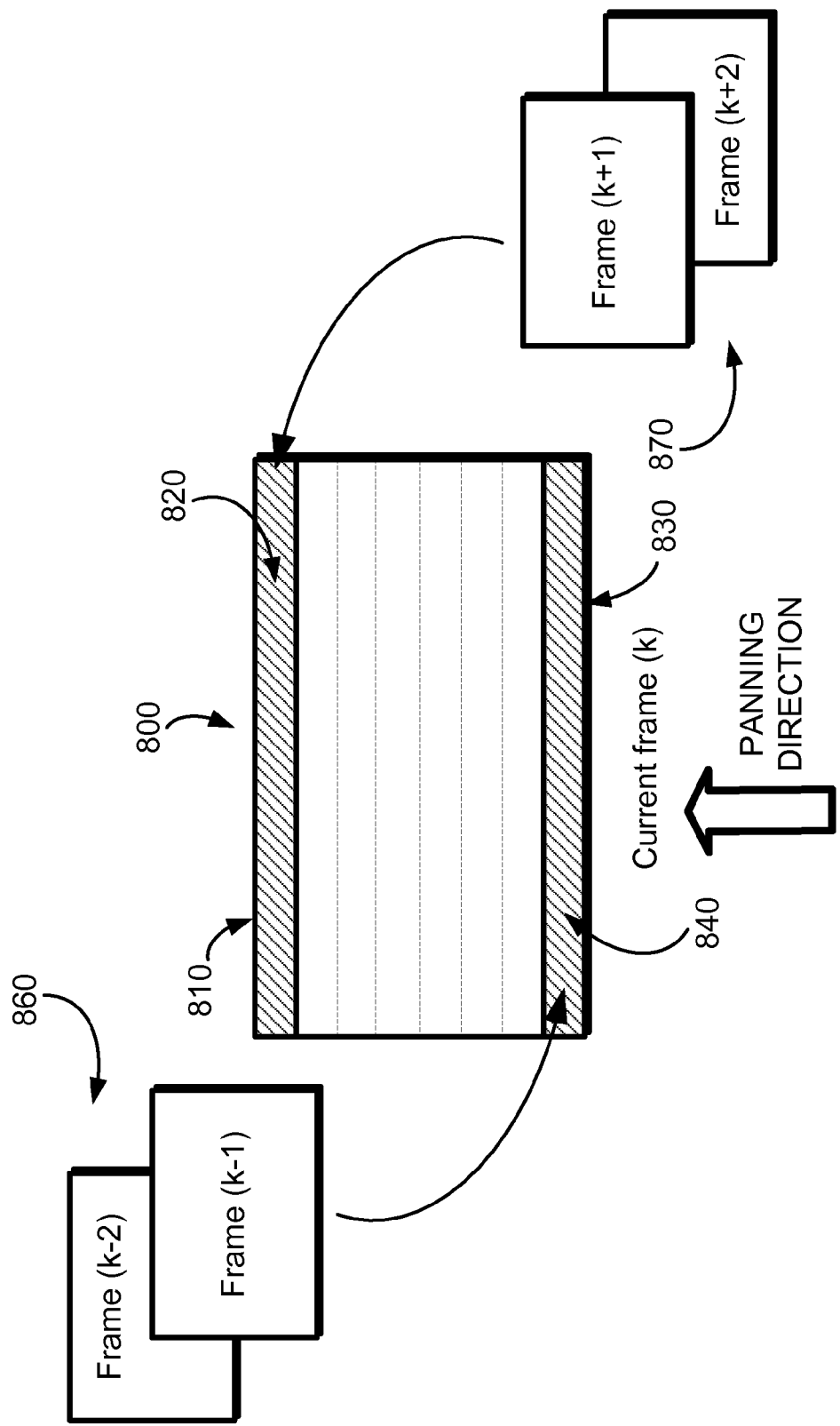

FIGS. 8A and 8B are each a diagram illustrating reduction of a jarring effect on vertical panning content by utilizing previous and/or subsequent frames, in accordance with embodiments of the invention. Referring to FIG. 8A, there is shown a current frame 800 of a scaled video image. The scaled video image may have been scaled uniformly or non-uniformly. The current frame 800 may be referred to as current frame (k), where k is a temporal indication of the position of the frame in a sequence of frames associated with the video image. Also shown in the current frame 800 are the various scaling regions utilized when scaling the video image. Of these scaling regions, a first end region or portion 820 is shown as the top-most scaling region associated with the top horizontal edge 810 of the current frame 800 of the scaled video image. Also shown is a second end region or portion 840, which is the bottom-most scaling region and is associated with the bottom horizontal edge 830 of the current frame 800 of the scaled video image.

When a panning motion is detected from top-to-bottom, as shown by the arrow labeled "PANNING DIRECTION," the current frame 800 of the scaled video image may be augmented or enhanced to reduce the jarring effect that may occur as a result of the panning. For example, the first end portion 820 may be augmented or enhanced with information from frames 860 that are previous to the current frame 800 in a sequence of frames. In this instance, the first end portion 820 may be modified or adjusted utilizing information from a frame (k−1) and a frame (k−2), however, more or fewer previous frames may be utilized. The information from the previous frames may be combined with that of the current frame 800 to adjust or modify the first end portion 820. For example, interpolation operations may be utilized to combine the information of the current frame 800 and the information of the previous frames.

The second end portion 840, which is opposite to the first end portion 820, may be augmented or enhanced with information from frames 870 that are future to or subsequent to the current frame 800 in a sequence of frames. In this instance, the second end portion 840 may be modified or adjusted utilizing information from a frame (k+1) and a frame (k+2), however, more or fewer subsequent frames may be utilized. The information from the subsequent frames may be combined with that of the current frame 800 to adjust or modify the second end portion 840. For example, interpolation operations may be utilized to combine the information of the current frame 800 and the information of the subsequent frames.

With respect to FIG. 8B, when a panning motion is detected from bottom-to-top, as shown by the arrow labeled "PANNING DIRECTION," the current frame 800 of the scaled video image may be augmented or enhanced to reduce the jarring effect that may occur as a result of the panning. For example, the first end portion 820 may be augmented or enhanced with information from subsequent frames 870. In this instance, the first end portion 820 may be modified or adjusted utilizing information from a frame (k−1) and a frame (k+2), however, more or fewer subsequent frames may be utilized. The information from the subsequent frames may be combined with that of the current frame 800 to adjust or modify the first end portion 820. For example, interpolation operations may be utilized to combine the information of the current frame 800 and the information of the subsequent frames.

The second end portion 840, which is opposite to the first end portion 820, may be augmented or enhanced with information from previous frames 860. In this instance, the second end portion 840 may be modified or adjusted utilizing information from a frame (k−1) and a frame (k−2), however, more or fewer previous frames may be utilized. The information from the previous frames may be combined with that of the current frame 800 to adjust or modify the second end portion 840. For example, interpolation operations may be utilized to combine the information of the current frame 800 and the information of the subsequent frames.

When utilizing information from previous or subsequent frames, the information considered may be that of regions or portions of those frames that correspond to the first end portion 820 or the second end portion 840. For example, the previous and/or subsequent frames may also be divided into the same or substantially the same scaling regions or portions utilized in connection with the current frame 800.

Figure 9:
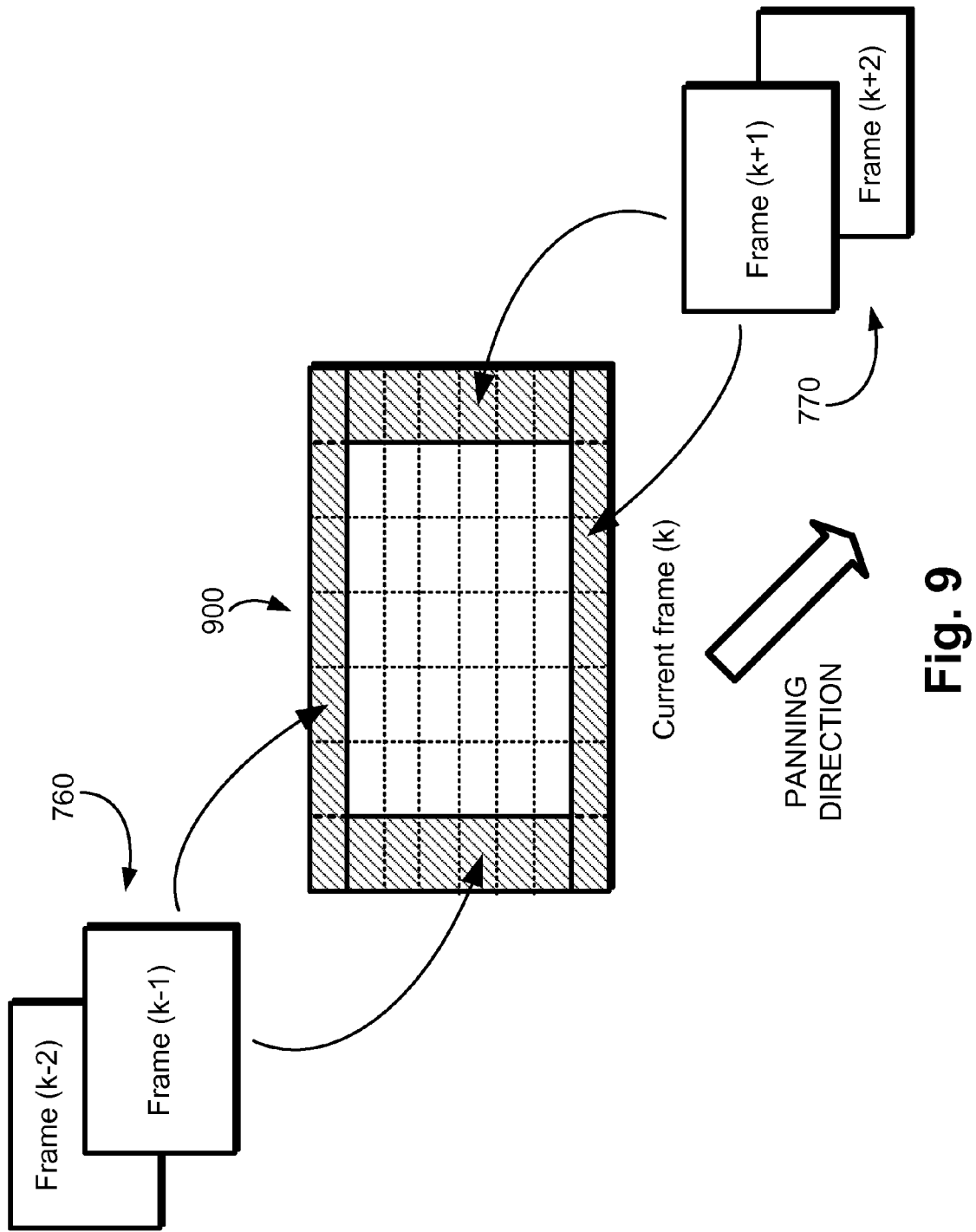
FIG. 9 is a diagram illustrating reduction of a jarring effect on a right-down panning content by utilizing previous and/or subsequent frames, in accordance with an embodiment of the invention.

FIG. 9 is a diagram illustrating reduction of a jarring effect on a right-down panning content by utilizing previous and/or subsequent frames, in accordance with an embodiment of the invention. Referring to FIG. 9, there is shown a current frame 900 of a scaled video image. The scaled video image may have been scaled uniformly or non-uniformly. The current frame 900 may be referred to as current frame (k), where k is a temporal indication of the position of the frame in a sequence of frames associated with the video image. Also shown in the current frame 900 are the various scaling regions utilized when scaling the video image.

When a panning motion is detected having a right-down direction, as shown by the arrow labeled "PANNING DIRECTION," the current frame 900 of the scaled video image may be augmented or enhanced to reduce the jarring effect that may occur as a result of the panning. For example, top and left portions of the current frame 900 may be augmented or enhanced with information from frames 960 that are previous to the current frame 900 in a sequence of frames. In this instance, the top and left portions may be modified or adjusted utilizing information from a frame (k−1) and a frame (k−2), however, more or fewer previous frames may be utilized. The information from the previous frames may be combined with that of the current frame 900 to adjust or modify the top and left portions of the current frame 900. For example, interpolation operations may be utilized to combine the information of the current frame 900 and the information of the previous frames.

The bottom and right portions of the current frame 900 may be augmented or enhanced with information from frames 970 that are future to or subsequent to the current frame 900 in a sequence of frames. In this instance, the bottom and right portions of the current frame 900 may be modified or adjusted utilizing information from a frame (k−1) and a frame (k+2), however, more or fewer subsequent frames may be utilized. The information from the subsequent frames may be combined with that of the current frame 900 to adjust or modify the bottom and right portions of the current frame 900. For example, interpolation operations may be utilized to combine the information of the current frame 900 and the information of the subsequent frames.

For panning directions different from the one shown in FIG. 9, the current frame 900 of the scaled video image may be augmented or enhanced using a substantially similar approach to that described above with respect to FIG. 9. For example, a substantially similar approach may be utilized when the panning directions is right-up, left-down, or left-up. Based on the direction detected, information from various portions of the current frame 900 may be combined with information from one or more previous frames and/or from one or more subsequent frames.

The operations described above with respect to FIGS. 7A, 7B, 8A, 8B, and 9, may be performed by the DTV SoC 200, for example. In this regard, the DTV SoC 200 may obtain previous frame information and/or subsequent frame information that may be stored or buffered in, for example, the memory module 250. Moreover, the operations described above with respect to FIGS. 7A, 7B, 8A, 8B, and 9 need not be limited to full screen scaling, for example, but may also be utilized in instances where the scaling involves less than a full screen.

Figure 10:
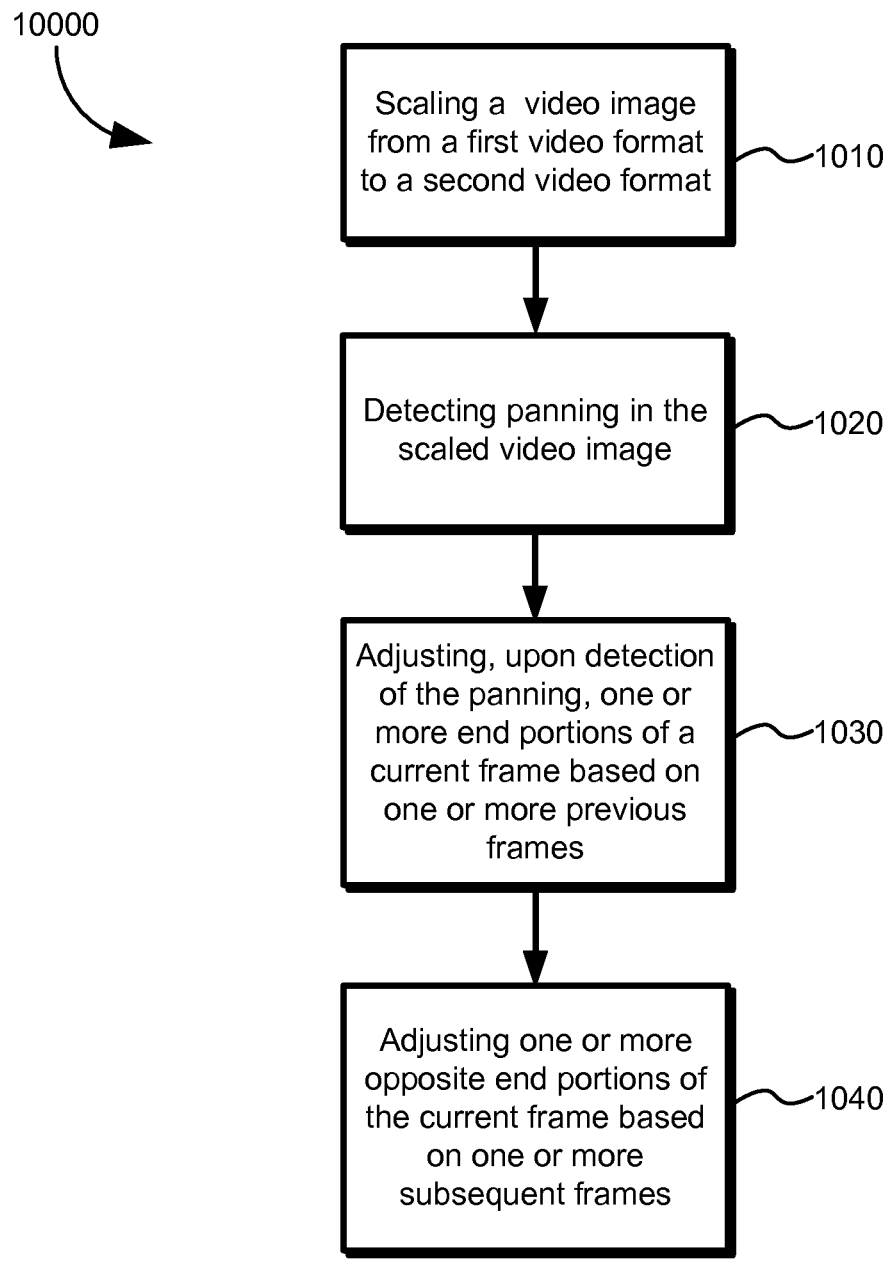
FIG. 10 is a flow diagram illustrating exemplary steps for reducing a jarring effect on panning content, in accordance with an embodiment of the invention.

FIG. 10 is a flow diagram illustrating exemplary steps for reducing a jarring effect on panning content, in accordance with an embodiment of the invention. Referring to FIG. 10, there is shown a flow chart 1000 in which, at step 1010, a scaling of a video image may be performed to scale the video image from a first video format to a second video format. The scaling may be non-uniform scaling, such as an anamorphic scaling, for example. The scaling may be performed by the DTV SoC 200 or other like device. Moreover, the first video format may be a 4:3 standard aspect ratio video format while the second video format may be a 16:9 high-definition or widescreen aspect ratio video format. However, the scaling may be from any one video format to any other video format.

At 1020, the DTV SoC 200 may be utilized to detect panning in the scaled video image. The panning detection may comprise detecting a direction or motion associated with the panning. Moreover, the panning detection may comprise detecting multiple pannings that may be associated with the scaled video image. For example, camera rotation and a ticker may be occurring concurrently and may both be detected. In addition, when multiple pannings occur in connection with a scaled video image, one or more pannings may have one direction and one or more pannings may have an opposite direction.

At step 1030, upon the detection of a panning motion or direction, the DTV SoC 200 may adjust one or more end portions of a current frame of the video image based on other frames in the sequence of frames. As described above with respect to, for example FIGS. 7A-9, information associated with an end portion of one or more previous frames may be utilized to adjust a corresponding end portion of the current frame. When the panning motion or direction is from left to right (see FIG. 7A), the previous frame information may be utilized to adjust a left end portion of the current frame. When the panning motion or direction is from right to left (see FIG. 7B), the previous frame information may be utilize to adjust a right end portion of the current frame. Previous frame information may also be utilized when the panning motion or direction is top-to-bottom, bottom-to-top, right-down, right-up, left-down, or left-up.

At step 1040, one or more end portions of the current frame that are opposite to the one or more end portions adjusted at step 1030 may be adjusted based on information associated with corresponding end portions of one or more subsequent frames. When the panning motion or direction is from left to right (see FIG. 7A), the subsequent frame information may be utilized to adjust a right end portion of the current frame. When the panning motion or direction is from right to left (see FIG. 7B), the subsequent frame information may be utilized to adjust a left end portion of the current frame. Subsequent frame information may also be utilized when the panning motion or direction is top-to-bottom, bottom-to-top, right-down, right-up, left-down, or left-up.

Figure 11:
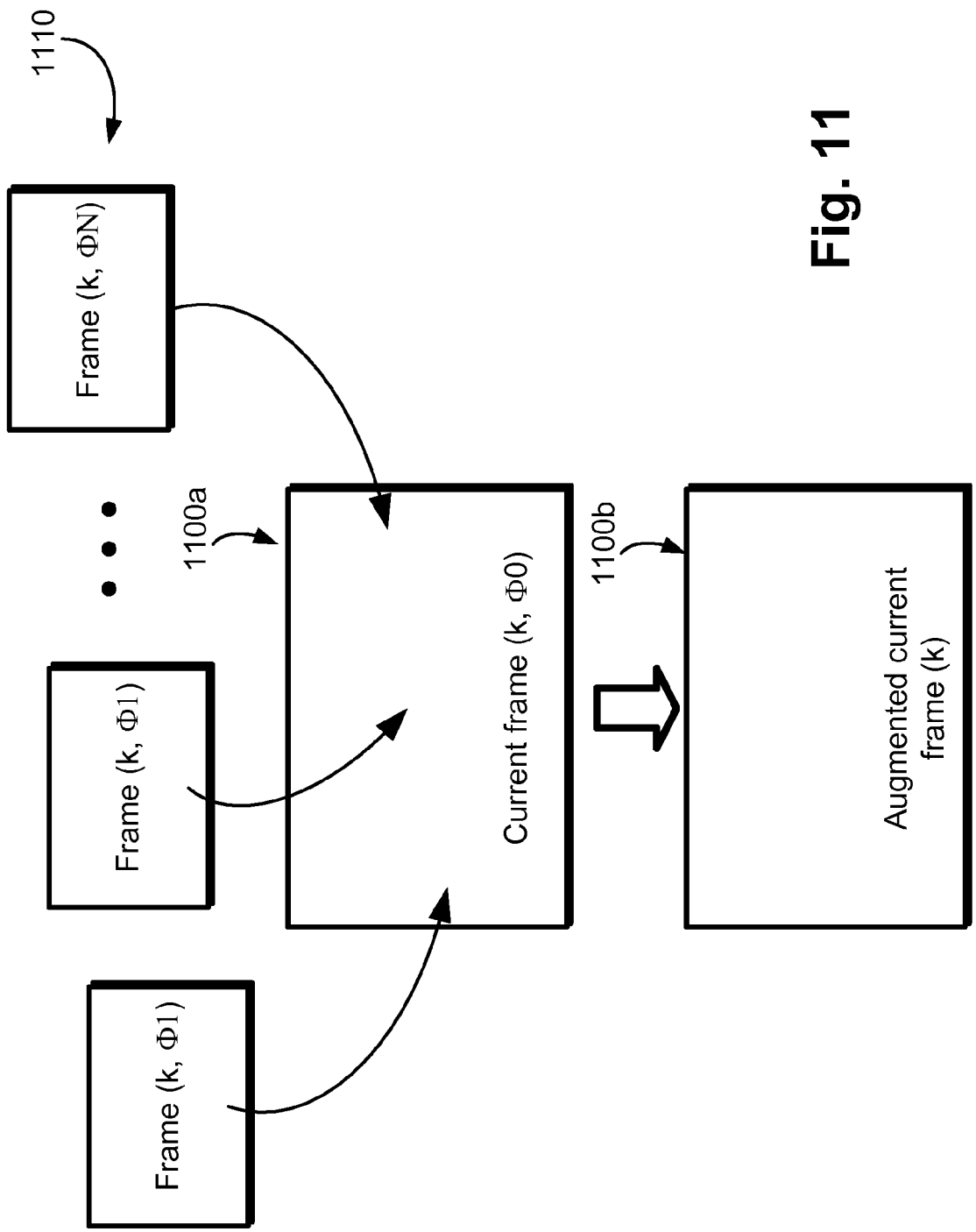
FIG. 11 is a diagram illustrating augmentation of a digitally zoomed video image based on frames having a different viewing angle, in accordance with an embodiment of the invention.

FIG. 11 is a diagram illustrating augmentation of a digitally zoomed video image based on frames having a different viewing angle, in accordance with an embodiment of the invention. Referring to FIG. 11, there is shown a current frame 900a of a digitally zoomed video image. The current frame 1100a may be referred to as current frame (k, Φ0), where k is a temporal indication of the position of the frame in a sequence of frames associated with the video image and Φ0 is a viewing angle associated with the filming or capturing of the current frame 1100a. Also shown is one or more frames 1110 that are related to the current frame 1100a. In this regard, the related frames 1110 may correspond to frames having the same temporal position (k) in a sequence of frames but with different viewing angles. That is, the related frames 1110 may have been filmed or captured concurrently with the current frame 1100a, but may have been filmed or captured with different viewing angles than a viewing angle of the current frame 1100a. Also shown in FIG. 11 is an augmented or enhanced current frame 1100b that may result from the combination of information from the related frames 1110 and information from the current frame 1100a.

The operations described above with respect to FIG. 11 need not be limited to full screen scaling or digital zooming, for example, but may also be utilized in instances where the scaling or digital zooming involves less than a full screen.

Figure 12:
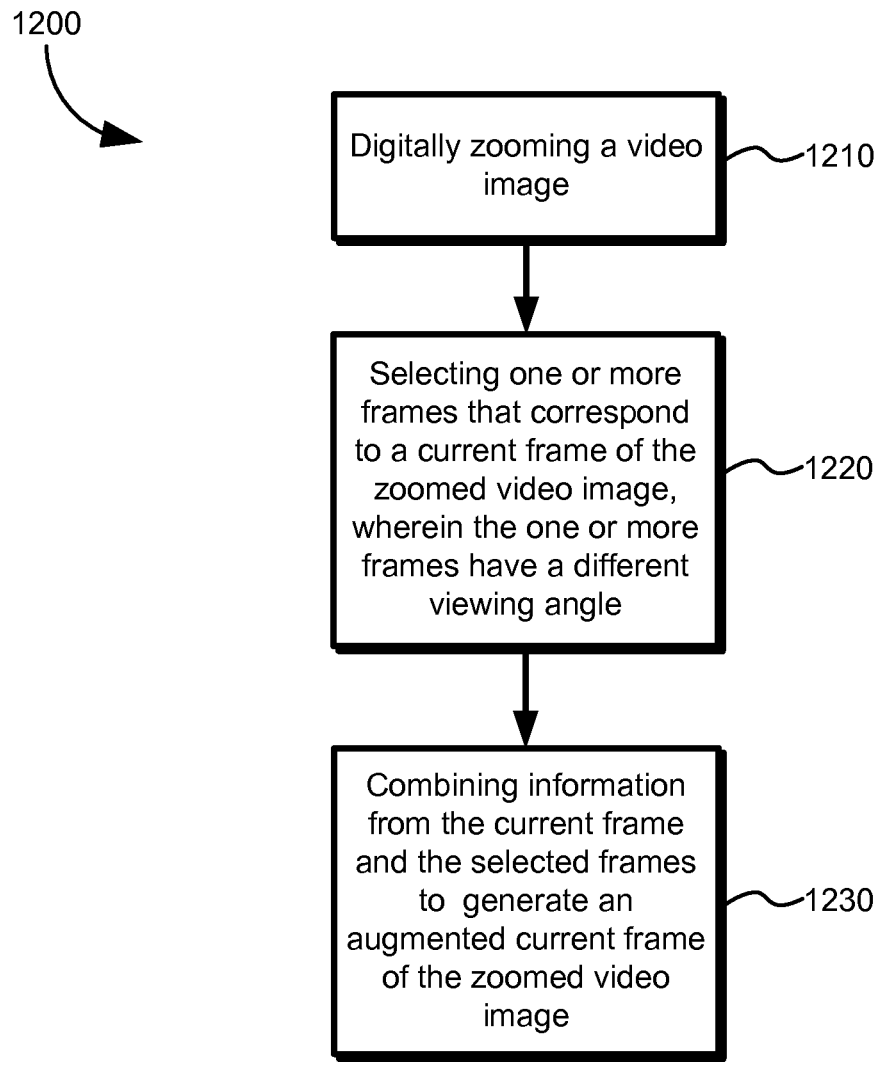
FIG. 12 is a flow diagram illustrating exemplary steps for augmenting a zoomed video image, in accordance with an embodiment of the invention.

FIG. 12 is a flow diagram illustrating exemplary steps for augmenting a zoomed video image, in accordance with an embodiment of the invention. Referring to FIG. 12, there is shown a flow chart 1200 in which, at step 1210, a video image may be digitally zoomed by, for example, the DTV SoC 200. At step 1220, one or more frames that correspond to a current frame, such as frame 1100a described above with respect to FIG. 11, may be selected. The corresponding frames may be frames having the same or substantially the same position in a sequence of frames as the current frame but were filmed or captured at a different viewing angle from the viewing angle at which the current frame was filmed or captured. For example, the corresponding frames may be the related frames 1110 described above with respect to FIG. 11. At step 1230, the DTV SoC 200, for example, may be utilized to combine the information in the current frame 1100a and the information in the corresponding frames selected at step 1220. The combination may be based on an interpolation operation or other like operation, for example.

The various aspects ratios described above in connection with the embodiments of the invention have been provided by way of illustration and not of limitation. Other aspect ratios may also be utilized in connection with the content received by the DTV SoC 200 and/or with the content generated by the DTV SoC 200 for display. For example, the scaling performed by the DTV SoC 200 may support scaling from a first video format of several video formats having different aspect ratios to a second video format of several video formats having different aspect ratios. Moreover, while scaling a video image may typically refer to digitally zooming to full screen, it may also refer to those instances when the scaling involves different proportions of the full screen based on the application and/or the user. In this regard, the scaling supported by the DTV SoC 200 need not be limited to full screen scaling, for example, but may also be utilized in instances where the scaling involves less than the a full screen.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for providing better picture quality in various zoom modes.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a video processing device:
      non-uniformly scaling a video image from a first display format to a second display format;
      detecting panning associated with said scaled video image; and
      adjusting, when said panning is detected, a first end portion of a current frame of said scaled video image, wherein said adjustment is based on one or more frames of said scaled video image that are previous to said current frame;
   wherein a second end portion of said current frame that is opposite to said first end portion of said current frame is adjusted based on one or more frames of said scaled video image that are subsequent to said current frame.

2. The method of claim 1, wherein said first display format is a 4:3 aspect ratio display format and said second display format is a 16:9 aspect ratio display format.

3. The method of claim 1, wherein said adjusting of said first end portion of said current frame comprises combining information of said first end portion of said current frame with information of a corresponding end portion of said one or more frames that are previous to said current frame.

4. The method of claim 1, wherein said adjusting of said second end portion of said current frame comprises combining information of said second end portion of said current frame with information of a corresponding end portion of said one or more frames that are subsequent to said current frame.

5. The method of claim 1, wherein:
   said panning is a substantially horizontal panning;
   said first end portion of the current frame is associated with a vertical end of said current frame; and
   said second end portion of the current frame is associated with the other vertical end of the current frame.

6. The method of claim 1, wherein said non-uniform scaling of said video image comprises an anamorphic scaling.

7. A system, comprising:
   one or more processors, one or more circuits, or any combination thereof for use in a video processing device, said one or more processors, one or more circuits, or any combination thereof being operable to:
      non-uniformly scale a video image from a first display format to a second display format;
      detect panning associated with said scaled video image; and
      adjust, when said panning is detected, a first end portion of a current frame of said scaled video image, wherein said adjustment is based on one or more frames of said scaled video image that are previous to said current frame;
   wherein a second end portion of said current frame that is opposite to said first end portion of said current frame is adjusted by said one or more processors, one or more circuits, or any combination thereof based on one or more frames of said scaled video image that are subsequent to said current frame.

8. The system of claim 7, wherein said first display format is a 4:3 aspect ratio display format and said second display format is a 16:9 aspect ratio display format.

9. The system of claim 7, wherein said one or more processors, one or more circuits, or any combination thereof are operable to combine information of said first end portion of said current frame with information of a corresponding end portion of said one or more frames that are previous to said current frame.

10. The system of claim 7, wherein said one or more processors, one or more circuits, or any combination thereof are operable to combine information of said second end portion of the current frame with information of a corresponding end portion of said one or more frames that are subsequent to said current frame.

11. The system of claim 7, wherein:
   said panning is a substantially horizontal panning;
   said first end portion of said current frame is associated with a vertical end of said current frame; and
   said second end portion of the current frame is associated with the other vertical end of said current frame.

12. The system of claim 7, wherein the one or more processors, one or more circuits, or any combination thereof are operable to non-uniformly scale the video image by utilizing an anamorphic scaling.

13. A system, comprising:
   circuitry configured to:
      non-uniformly scale a video image from a first display format to a second display format;
      detect panning associated with said scaled video image; and
      adjust, when said panning is detected, a first end portion of a current frame of said scaled video image, wherein said adjustment is based on one or more frames of said scaled video image that are previous to said current frame;
   wherein a second end portion of said current frame that is opposite to said first end portion of said current frame is adjusted by said circuitry based on one or more frames of said scaled video image that are subsequent to said current frame.

14. The system of claim 13, wherein said circuitry is further configured to combine information of said second end portion of the current frame with information of a corresponding end portion of said one or more frames that are subsequent to said current frame.

16. The system of claim 13, wherein:
said panning is a substantially horizontal panning;
said first end portion of said current frame is associated with a vertical end of said current frame; and
said second end portion of the current frame is associated with the other vertical end of said current frame.

16. The system of claim 13, wherein said circuitry configured to non-uniformly scale the video image comprises circuitry configured to utilize an anamorphic scaling.

\* \* \* \* \*